(12) United States Patent
Howe

(10) Patent No.: US 8,924,433 B2
(45) Date of Patent: Dec. 30, 2014

(54) METHODS FOR GEOTEMPORAL FINGERPRINTING

(71) Applicant: MasterCard International Incorporated, Purchase, NY (US)

(72) Inventor: Justin Xavier Howe, Larchmont, NY (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 13/671,791

(22) Filed: Nov. 8, 2012

(65) Prior Publication Data

US 2014/0129596 A1    May 8, 2014

(51) Int. Cl.
*G06F 17/30* (2006.01)
*G06F 7/00* (2006.01)

(52) U.S. Cl.
USPC ............................................ 707/803

(58) Field of Classification Search
USPC ............. 707/803; 705/16, 39, 64, 21, 26.1; 455/410, 411, 456.1; 419/38
See application file for complete search history.

(56) References Cited

U.S. PATENT DOCUMENTS

| | | | |
|---|---|---|---|
| 7,885,668 B2 * | 2/2011 | Montenegro | 455/456.5 |
| 8,521,131 B1 | 8/2013 | Ramalingam et al. | |
| 8,589,290 B2 * | 11/2013 | Baskerville | 705/39 |
| 2006/0085357 A1 | 4/2006 | Pizarro | |
| 2008/0301041 A1 | 12/2008 | Bruk | |
| 2008/0312991 A1 * | 12/2008 | Bharadwaj et al. | 705/7 |
| 2010/0151882 A1 * | 6/2010 | Gillies et al. | 455/456.1 |
| 2011/0013528 A1 * | 1/2011 | Chen | 370/252 |
| 2011/0099375 A1 * | 4/2011 | Hammes et al. | 713/168 |
| 2011/0238514 A1 | 9/2011 | Ramalingam et al. | |
| 2011/0238517 A1 | 9/2011 | Ramalingam et al. | |
| 2012/0078503 A1 * | 3/2012 | Dzubay et al. | 701/410 |
| 2013/0290119 A1 | 10/2013 | Howe et al. | |
| 2014/0045530 A1 * | 2/2014 | Gordon et al. | 455/456.2 |

\* cited by examiner

*Primary Examiner* — Usmaan Saeed
*Assistant Examiner* — Raquel Perez-Arroyo
(74) *Attorney, Agent, or Firm* — Hoffmann & Baron, LLP

(57) ABSTRACT

Records of geotemporal data for a plurality of users from a database associated with on-line and/or mobile cellular activities are used to generate a geotemporal fingerprint of a user. The geolocation history associated with the user's on-line and/or mobile cellular activities from one such database can be correlated with a user's geolocation data from a separate on-line database associated with a different activity. For example, the geolocation history or geotemporal fingerprints associated with on-line and/or mobile cellular activities from one particular database can be correlated with those associated with payment card usage. Such information can be used to authenticate a user, for example, as a security measure for payment card users and issuers, for registrationless credit security applications, and for gathering relevant data for advertising campaigns.

10 Claims, 4 Drawing Sheets

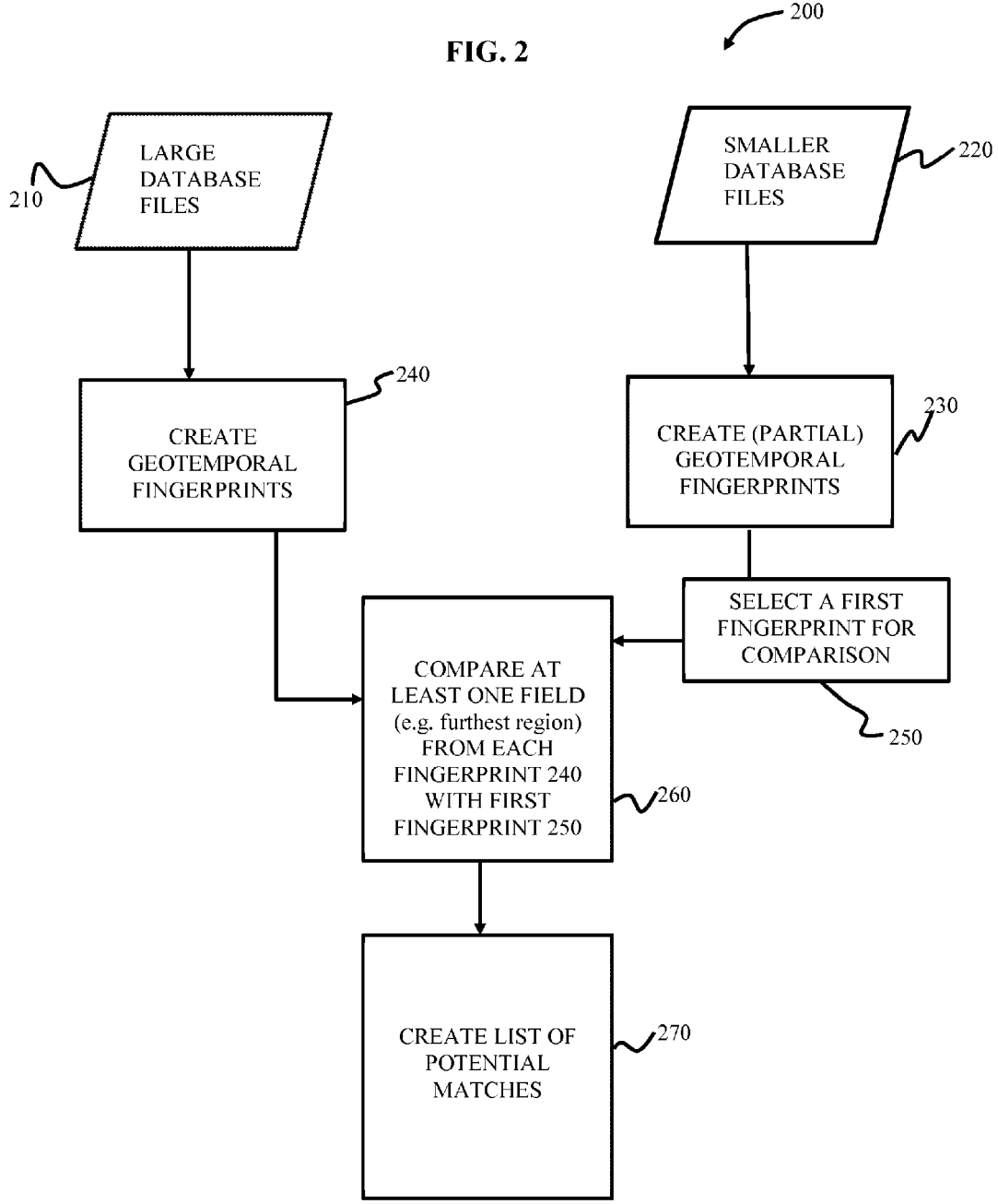

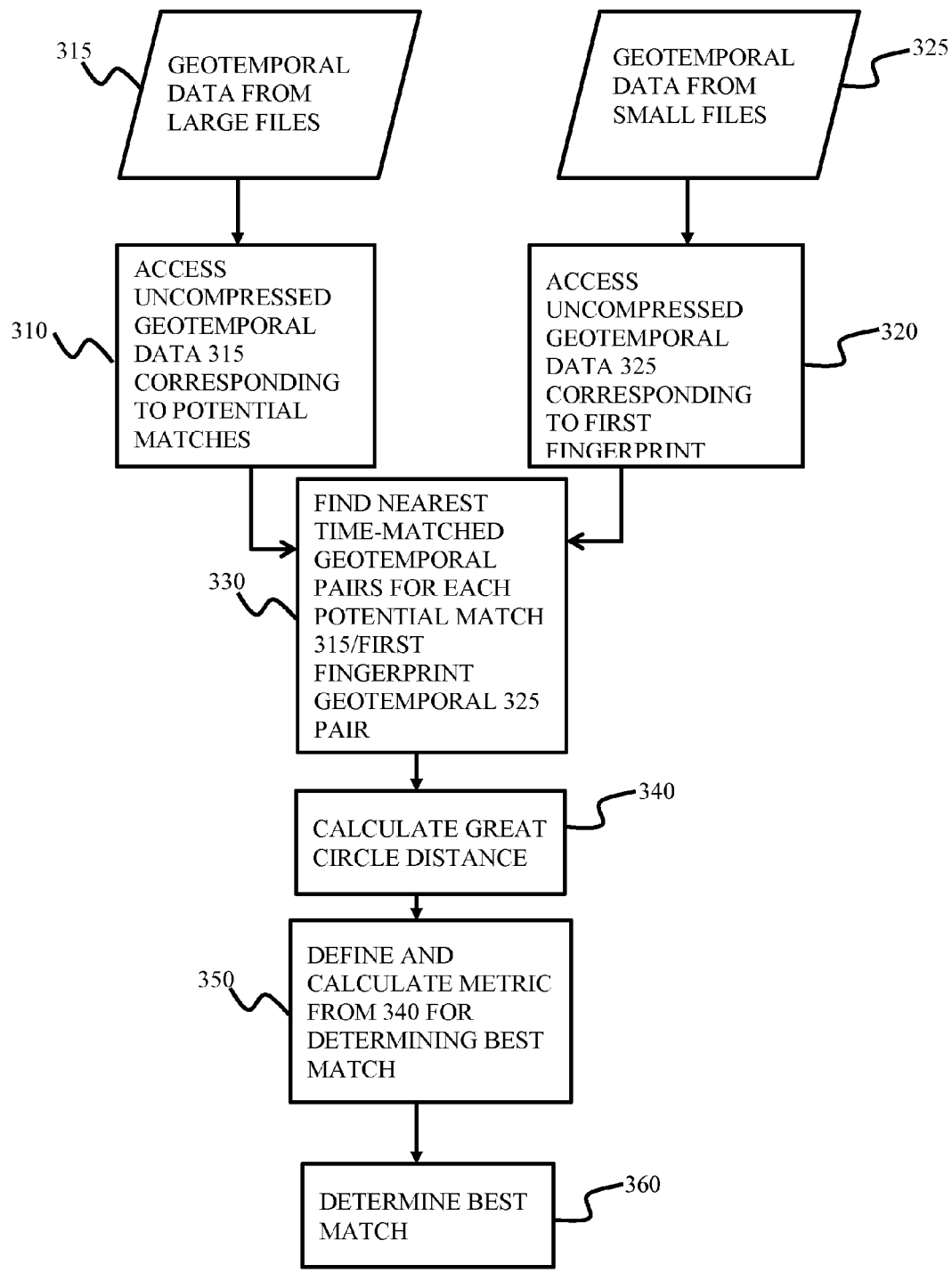

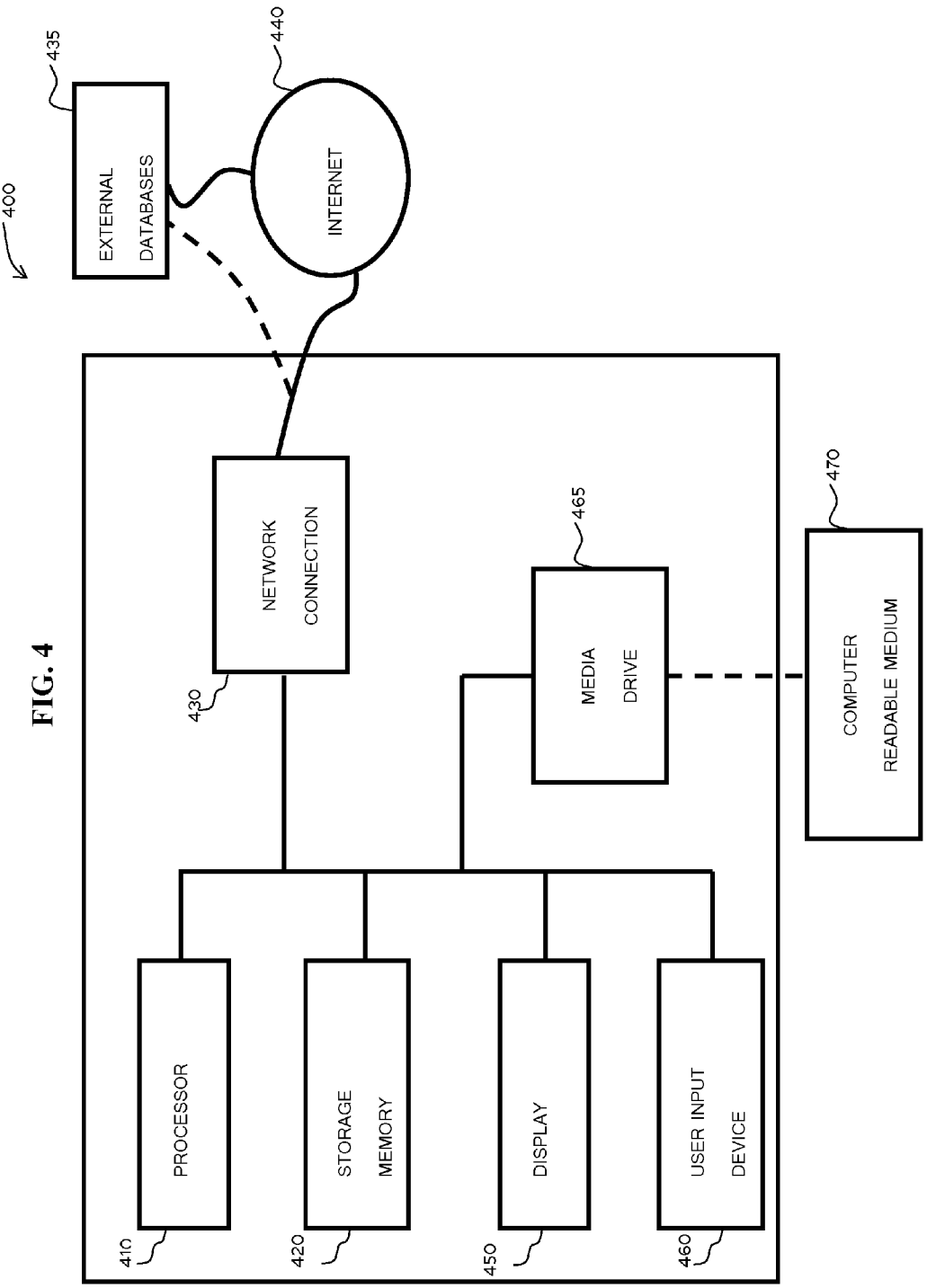

US 8,924,433 B2

METHODS FOR GEOTEMPORAL FINGERPRINTING

FIELD OF THE INVENTION

The present invention relates to geotemporal fingerprints of a user's recorded social activity, and, more particularly, to a method for authenticating a payment card user by generating and comparing geotemporal fingerprints of users' on-line social activities with records of payment card usage.

BACKGROUND OF THE INVENTION

Geolocation data corresponding to various aspects of one's activities is readily available. For example, many users have a Global Positioning System (GPS) associated with their activities in one way or another. Such GPS devices are installed in many automobiles today, either as stand-alone transportable units, or as integrated units positioned in the dashboard of the automobile as purchased. Additionally, many watches and smart phones are now available with embedded GPS receivers and the availability to access a mapping application for providing real-time global positioning and tracking capability.

While it is straightforward to determine the path of a user through the use of GPS, a temporal history of one's whereabouts can also be gleaned from many other sources. Even without a GPS receiver, the location of a cell phone on one's person can be roughly estimated from the regularly timed pings received from the device at a nearest receiver tower. More detailed location data is available when a user activates the cell phone to place a call. Similarly, information about the geolocation history and habits of users may be recorded from various internet and smart phone applications, such as FACEBOOK®, TWITTER®, FOURSQUARE®, and other social media applications, including those through which users voluntarily and routinely "check-in" or otherwise publish information of their physical locations at any particular time.

Another source of geolocation data is payment card usage. Both users and issuers of payment cards are particularly concerned with preventing unauthorized use of payment cards as early as possible. If a payment card user opts in to a payment card security system by providing his or her cell phone number, a direct correlation can be made between every point-of-sale purchase and the contemporaneous location of the user's cell phone. In co-owned, co-pending patent application Ser. No. 13/457,701, filed Apr. 27, 2012, entitled "Method for Providing Payment Card Security using Registrationless Telecom Geolocation Capture," by Howe et al., a method for enabling secure payment card usage without requiring a user to enroll or register is provided. A geo-temporal history of a payment card user's point-of-sale purchases is tracked to compare geolocation information for cell phones operated by a mobile network provider to contemporaneous cell phone location in order to match cell phone owners to their payment card accounts. A unique identification number can be assigned by the network provider in lieu of providing the matching cell phone numbers to the payment card issuer in order to maintain privacy. The identity of a payment card user can then be securely verified by the merchant in future purchases by querying the mobile network operator for the location of the payment card user's cell phone number (corresponding to the Identification Number) at the time of the purchase.

There is a continuing need in addressing payment card theft and fraud, for authenticating the identity of a card user based on the card user's point of sale as well as other usage, without the need for a user to enroll in a credit fraud reporting service. There is also a need, not addressed in any prior art, for relating databases of users' on-line or other recorded social activity(s) (such as cell phone, FACEBOOK®, FOURSQUARE®, and so-on) to match-up a user's activity recorded for one service with a different activity recorded for another service. Such information could be useful, for example, in developing targeted advertising campaigns.

SUMMARY OF THE INVENTION

The present invention provides a method and system for using the geolocation history associated with a user's on-line and/or mobile cellular activities to generate a geotemporal fingerprint of the user. The present invention additionally provides a method and system for correlating the geolocation history associated with a user's on-line and/or mobile cellular activities from one particular data base with a user's geolocation data from a separate on-line database associated with a different activity. In particular embodiments, the geolocation history associated with on-line and/or mobile cellular activities from one particular data base is correlated with geolocation data associated with payment card usage. Such information can be used, for example, to authenticate a user, for example, as a security measure for payment card users and issuers.

In accordance with one aspect of the present invention, a method for generating a geotemporal fingerprint associated with a user from a database of geotemporal data recorded for a plurality of users is provided. The method includes retrieving geotemporal data records for the plurality of users over a predetermined period of time, where each of the geotemporal data records includes temporal data and a geolocation indicating a time and place the geotemporal data record is generated, and a User ID associated with the user generating the geotemporal data.

The method further includes determining fields for defining a geotemporal fingerprint associated with each user from the geotemporal data records for the corresponding User ID, where the fields preferably distinguish the user from other users associated with the database. A geotemporal fingerprint associated with each User ID is then generated based on the fields.

In an additional aspect, the method further includes identifying and recording a georegion encompassing the geolocation for each of the geotemporal data records. The fields can include a primary georegion, where the primary georegion corresponds to the georegion in which each of the plurality of users is located for a longest time period within the predetermined period of time.

A total length of time can then be calculated from the temporal data associated with each of the georegions for each User ID, and the primary georegion for each User ID identified from the calculated total length of time. The method can further include generating the geotemporal fingerprint to include the primary georegion associated with each User ID.

The fields used to generate the geotemporal fingerprints can further include a secondary georegion, the secondary georegion corresponding to the georegion in which each of the plurality of users is located for a second longest time period within the predetermined period of time. Geotemporal fingerprints can then be generated which include the secondary georegion associated with each User ID.

The geotemporal data records can be cell phone data, generated from payment card usage, or generated from one or more social networking activity.

In other aspects, geotemporal fingerprints generated from a first database of geotemporal data records in accordance with the invention can be used to link a user or user account associated with the first database to a user account associated with a second database.

Another method of the present invention is provided for linking a first user account associated with a first database including geotemporal data records for a plurality of users with a second user account associated with a second database including geotemporal data records for the plurality of users. Each of the geotemporal data records includes temporal data and a geolocation indicating a time and place the geotemporal data record is generated and a User ID associated with one of the plurality of users. The method includes retrieving geotemporal data records for a first user from the first database generated over a predetermined period of time, each of the geotemporal data records retrieved including a first User ID associated with the first user. The method further includes determining fields for defining for each user a geotemporal fingerprint associated with the user from the geotemporal data records with the corresponding User ID. Preferably, the fields are chosen to distinguish the user from other users associated with the database.

The method further includes generating a first geotemporal fingerprint corresponding to the first User ID based on the fields and retrieving geotemporal data records from the second database generated for the plurality of users over the predetermined period of time. Each of the geotemporal data records retrieved from the second database include a second User ID associated with one of the plurality of users.

A set of second geotemporal fingerprints based on the fields are then generated from the geotemporal data records retrieved from the second database, a second geotemporal fingerprint being generated from geotemporal data records comprising the second User ID. The method further includes determining a best match from the set of second geotemporal fingerprints generated from the second database to the first geotemporal fingerprint, by comparing the geolocation and temporal data in the fields of the first geotemporal fingerprint with the geolocation and temporal data in the fields of the geotemporal data records associated with each of the second geotemporal fingerprints. The second User ID corresponding to the best match is linked with the first User ID corresponding to the first geotemporal fingerprint.

In a further aspect, determining the best match can include identifying a set of geotemporal data record pairs occurring within a predefined time period of one another for each first geotemporal fingerprint/potential match pair; and calculating a parameter indicating a geographical distance between the geolocations of each of the geotemporal data record pairs to identify a best match from the potential matches to the first geotemporal fingerprint.

The parameter can be a great circle distance between the geolocations of each of the geotemporal data record pairs, the method further including calculating the great circle distance calculated for each of the geotemporal data record pairs within the set for each potential match. In one aspect, the best match is the one of the potential matches having a lowest mean great circle distance.

In various additional aspects, the first database includes cell phone ping data and the second database comprises geotemporal data records generated by payment card usage for the plurality of users.

In other aspects, at least one of the first database and the second database comprises geotemporal data records generated by a social network activity. The geolocations and temporal data recorded in the geotemporal data records generated by the social network activity can include internet protocol (IP) addresses, global positioning system (GPS) data, cellular phone ping data, call record details, or time-stamped textual data.

In addition to the above aspects of the present invention, additional aspects, objects, features and advantages will be apparent from the embodiments presented in the following description and in connection with the accompanying drawings.

BRIEF DESCRIPTION OF THE DRAWINGS

FIG. 2 is a flow diagram representation of an embodiment of a method of the present disclosure for identifying potential matches to a geotemporal fingerprint generated from one database from geotemporal fingerprints from a second database.

FIG. 3 is a flow diagram representation of an embodiment of a method of the present disclosure for identifying a best match to a geotemporal fingerprint generated from one database from geotemporal fingerprints from a second database.

FIG. 4 is a schematic representation of an embodiment of a system for implementing various embodiments of the methods of the present disclosure.

DETAILED DESCRIPTION OF THE EMBODIMENTS

Figure 1:
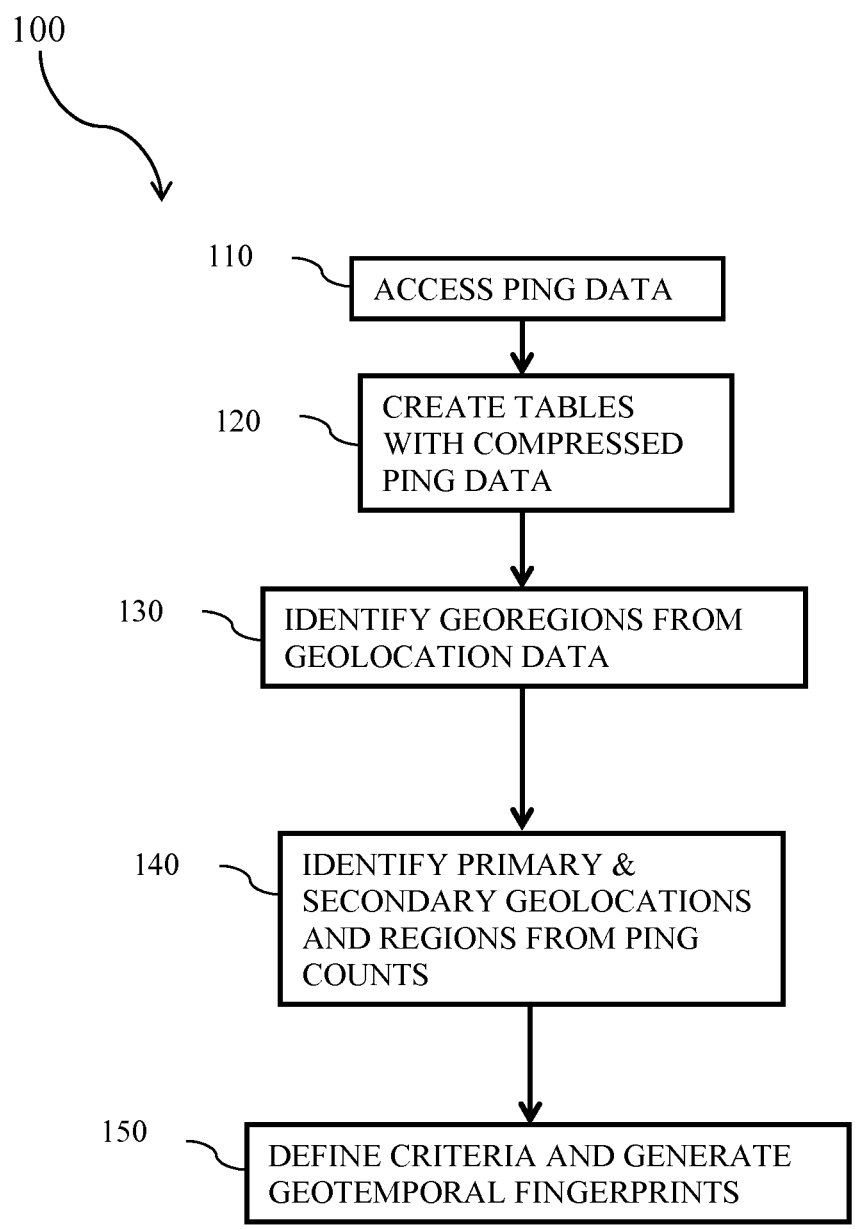
FIG. 1 is a flow diagram representation of an embodiment of a method of the present disclosure for generating geotemporal fingerprints from cell phone ping data.

The following sections describe exemplary embodiments of the present invention. It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto.

Throughout the description, where items are described as having, including, or comprising one or more specific components, or where methods are described as having, including, or comprising one or more specific steps, it is contemplated that, additionally, there are items of the present invention that consist essentially of, or consist of, the one or more recited components, and that there are methods according to the present invention that consist essentially of, or consist of, the one or more recited processing steps.

It should also be understood that the order of steps or order for performing certain actions is immaterial, as long as the invention remains operable. Moreover, two or more steps or actions may be conducted simultaneously.

A "geotemporal fingerprint" is compiled from a series of geolocations and timestamps that describe a person's travels and activities over a period of time, as further described herein.

The term "geolocation" as used herein refers to a user's location as collected from a cell phone tower or beacon, GPS, or other position indicators, and can include GPS coordinates, street address, an IP address, geo-stamps on digital photographs, smartphone check-in or other data, and other location data provided as a result, for example, of a telecommunications or on-line activity of a user. "Regions," or "georegions," are geographically defined regions corresponding to groupings of geolocation data, and can refer to cell phone tower broadcast areas, metropolitan areas, counties, states, or other groupings made in accordance with the geolocation data.

"Geotemporal" data is temporal and geolocation data (cell phone tower location, IP address, GPS coordinates) that is sent, usually along with other information, from a communications device a user is accessing (such as, a cell phone tower, computer, GPS device) to perform a certain activity at a particular time.

It is understood that, depending on applicable law, cardholders and/or social network and telephone users may need to be notified of the processes by which various information is obtained, as described herein, by their issuer and/or mobile network operator. In certain cases, their specific consent may be needed to include their information in the relevant tables described herein.

The present invention is directed to a method and system for generating a geotemporal fingerprint from a database of users' activities. The geotemporal fingerprint can be used to distinguish a user from other users of a database based on criteria associated with the historical geolocation activity recorded and stored in the database for each user. The generation of geotemporal fingerprints of a user's activity is useful for many applications, including for identification of payment card fraud without the need for an enrollment or registration process. Although, under applicable laws, even if one's privacy and security is protected, appropriate specific consent may be warranted.

In one embodiment, a geotemporal fingerprint is generated for users of cell phones from "ping" data which includes geotemporal data. Optionally, call record data can also be retrieved from records of a cellular telephone usage database of a telecommunications service provider. A User ID is preferably associated with each cell phone user and associated with the geotemporal fingerprint for distinguishing the user from others in the cell phone database.

It is assumed herein that a user travels with his or her cell phone. As is known among those of ordinary skill in the art, a cell phone "pings" a nearest cell tower at regular intervals, for example, about every five minutes. A telecommunications service provider may store this information for a period of time, in some cases, up to about forty-eight (48) hours. The ping data includes a User ID associated with the cell phone from which the ping originates, and a geolocation, for example, a cell phone tower ID, which also corresponds to a georegion, or broadcast area, which is known to contain the user. If a call is made or GPS coordinates requested, however, the telecom provider will have more precise positional data, which is stored in call detail records.

Referring to FIG. 1, in accordance with one embodiment 100 of a method of the present disclosure, the ping data is retrieved for a plurality of users/subscribers of a telecommunications service provider 110 over a predetermined period of time, for example, one week, one month, or one year. The retrieved ping data is in time sequential order. The ping data is separated into tables, each table corresponding to a different user, or User ID. The ping data records are then reduced or compressed 120. The compression of ping data can be performed as the ping data is received from the cell phones, by the service provider, for example, or after retrieval of stored ping data from the service provider.

To compress the data, for each ping record received, an entry is either created or updated in a table, which contains the following fields: a) User ID; b) Geolocation; and c) Ping Count. The ping records are preferably sorted into separate tables, one for each User ID, and the entries created or updated in the table corresponding to the particular User ID.

If ping data for a User ID is imported that includes the same geolocation as the previous ping entered in the table, the ping count for that entry is increased by one (1). If a geolocation different than the previous time sequential entry, a new entry is created. Each new entry preferably includes a date and time of day. Once the table(s) containing the compressed ping records is populated, all records with a count below a predetermined threshold are preferably removed.

Each of the tables of compressed and filtered data thus provides a record of the various geolocations pinged by each cell phone user associated with each User ID, the time of day the cell phone user was at those locations, and a length of time (from the calculated ping counts) the cell phone user remained at each location. Furthermore, call detail records can also be retrieved with records of telephone calls associated with each User ID. Whenever a telephone call is made, more exact details of the caller's location are recorded. Such details, which include time of call, duration, and more precise triangulated position data from cell towers, can be used to supplement the ping data.

Referring still to FIG. 1, for each User ID, a so-called geotemporal fingerprint can be generated 150 from the ping data which preferably uniquely defines each user. For example, for each User ID, georegions can be identified that correspond with the geolocations 130. The geolocations, and the georegions, with the highest count are easily identified from the tables of ping data as a "primary geolocation" or "primary region," respectively 140. In most cases, the primary region will be the city or town where the user's residence is located. The geolocation with the second highest count can also be identified and marked as a secondary geolocation. This may indicate a place of employment, for example. More than one sequential geolocation entry occurring within a defined period of time may also be aggregated to define the primary and secondary georegions for each user ID to identify major cities visited. In addition, the call detail records (CDR) of telephone calls from the phone associated with the User ID may be used in conjunction with contemporaneous ping data to pinpoint a user's primary and secondary, usually a residential and a business address, respectively.

Once a primary and a secondary region are identified, other identifying criteria can be defined and ascertained from the ping (and, optionally, the CDR) data and recorded to generate each user's geotemporal fingerprint. For example, the farthest geolocation and associated region visited in the last week, month, and/or year, and a geolocation/region other than the primary and secondary regions visited only once a week, every other week, once a month, or according to any other temporal pattern.

The criteria for defining the geotemporal fingerprints is preferably sufficient to distinguish each geotemporal fingerprint from other geotemporal fingerprints generated for other User IDs from the same database of telecommunication activity. In addition, in order to match a geotemporal fingerprint generated from the records of one database with geotemporal fingerprints generated from records of a second database for the same user, the criteria is preferably adequately defined to determine a match between the two separate databases of user activity.

It is contemplated that many additional criteria can be set for defining geotemporal fingerprints 150 using details gleaned from geotemporal data, such as cellular phone ping data, which reflect a user's travels and distinguish the user from other users listed in the database. In additional embodiments, for example, a weighted statistical distance function can be defined as a product of a geographic distance "D" from the primary region (or from the secondary region) and a number "P" of pings over a predetermined period of time. Accordingly, the geotemporal fingerprint can include, for example, a farthest "time-weighted" region identified as having the highest P*D value. Multiple variations thereof are also contemplated as within the scope of the invention.

Preferably, the geotemporal fingerprint generated 150 for each user includes at least the following fields, which are populated using the location and temporal information provided by the ping (and, optionally, CDR) data:

Primary Geolocation
Primary Region associated with the Primary Geolocation(s)
Secondary Geolocation
Secondary Region associated with the Secondary Geolocation(s)
Geolocation (Cell Tower) and associated Region Farthest From Primary Region Visited in the Past Week
Geolocation (Cell Tower) and associated Region Farthest From Primary Region Visited in the Past Month
Geolocation (Cell Tower) and associated Region Farthest From Primary Region Visited in the Past 6 Months
Geolocation (Cell Tower) and associated Region Farthest From Primary Region Visited in the Past Year
Geolocation (Cell Tower) and associated Region Second Farthest From Primary Region Visited in the Past Week
Geolocation (Cell Tower) and associated Region Second Farthest From Primary Region Visited in the Past Month In one embodiment, the geotemporal fingerprints can also include a time of day and/or day of the week associated with each of the primary and secondary location. In addition, the geotemporal fingerprints can include an appropriate day of the week or month, and/or time of day, and so on, associated with each of the farthest regions visited.

In various other embodiments, a geotemporal fingerprint is generated from other databases related to other types of user activity, such as one of various types of on-line social networking databases or payment card usage. In these embodiments, a geotemporal fingerprint is similarly formed from the sequential geotemporal data, which can include Beacon or Cell Tower IDs or addresses, IP Addresses (for example, from a merchant location when a payment card is used, or from a computer/smart phone utilized by a user accessing social networking databases), or GPS Coordinates, for example. This data will also contain a User ID, a geolocation, and a date and time of day, and may also include a period of time associated with the use at the geolocation (for example, a time span over which a user is logged on to an activity and active). One of ordinary skill in the art will recognize that such geolocation data can be assigned to a geographical region defined by containment according to methods known in the art. For example, one-dimensional inputs (GPS coordinates) can be assigned to two-dimensional equivalents using, for example, commercially available Geographic Information System (GIS) software.

Referring to FIG. 2, in particular embodiments, the geotemporal fingerprints for cell phone users (created from large database 210) generated in accordance with the present invention can be compared to geotemporal fingerprints generated from payment card usage (from smaller database 220) to match a payment card user with a cell phone user. For example, records of payment card usage can be collected from a payment card issuer containing geolocation (point-of-sale) data including a merchant's location, as well as a date and time of purchase. Records of on-line purchases using one's payment card can also be collected with geolocation (IP address) and date and time information. Accordingly, geotemporal fingerprints can be created for payment card users, and correlated with the geotemporal fingerprints generated for users of cell phones, as described above. Such information can be used, for example, to identify payment card fraud or theft.

It should be appreciated that matching fingerprints generated from databases of two different kinds of activities, one of which provides a fairly complete geolocation history (such as cell phone ping data), than the other (such as payment card usage) is nontrivial. Similarly, comparing two geotemporal fingerprints derived from two on-line activities, such as FACEBOOK® and FOURSQUARE®, is also challenging because both represent a partial geolocation history.

Referring again to FIG. 2, in one embodiment of a method of the present disclosure 200, a first geotemporal fingerprint 250, which can be associated with a particular User ID, is selected from a plurality of geotemporal fingerprints 230 created from smaller database files 220 for comparison to every geotemporal fingerprint 240 created from larger database files 210. A field is selected for the comparison 260, which is preferably a field, such as "farthest region," which will result in a minimum amount of matches. The matches from the larger database file are then sorted and recorded in a "Potential_Match" database or table 270 for further detailed comparison.

In one embodiment, more than one field is selected for comparison 260. For example, all fields related to a "farthest region" recorded for the large geotemporal fingerprints 240 can be compared to those in the first geotemporal fingerprint 250. One or more closest-matching large geotemporal fingerprints can be selected by incrementing a counter associated therewith by one (1) for every 'farthest region' in common with the first geotemporal fingerprint 250. The larger geotemporal fingerprint(s) 240 with a highest count are then sorted and recorded in the "Potential_Match" database 270 for further detailed comparison to the first geotemporal fingerprint.

Referring to FIG. 3, for further comparison, the uncompressed (large) geotemporal data 315 corresponding to the geotemporal fingerprints in the Potential_Match database is preferably accessed 310, and the uncompressed (partial or small) geotemporal data 325 corresponding to the first geotemporal fingerprint is preferably accessed 320, for geotemporal comparison. Because the geotemporal data are generated by different sources, however, the records can not be expected to exactly match. In order to determine a common user associated with two different databases, therefore, matching algorithms are needed to identify geotemporal records associated with a user from one database which closely match in time and location to geotemporal records with a user from another database.

In one embodiment, each geotemporal record from the smaller geotemporal data source 325 used to form the first fingerprint is compared to a first one of the larger geotemporal data Potential_Match files to identify a set of nearest-time matched geotemporal pairs between the first one of the list of Potential_Match geotemporal file and the smaller geotemporal data source file 325. The nearest-time matched geotemporal pairs are within a predefined time period of one another. If no records in the larger Potential_Match file are within a predefined time period of one of the records of the smaller geotemporal data source file 325, then the data point from the larger geotemporal data source file is simply ignored. If no nearest-time matched records are identified for a particular Potential_Match file, that file is dropped from the list of Potential Matches. In certain embodiments, the predefined time period for comparing the records from the Potential_

Match files to the smaller geotemporal data file can be adjusted and the procedure repeated for each file in the Potential_Match list.

The number of geotemporal records in the larger data file that occur within the predefined time period of a geotemporal record from the smaller data file are also preferably added up and entered in the Potential_Matches database for the record corresponding to that geotemporal fingerprint, and used to confirm a temporal match between records.

Once one or more pairs of nearest-time matching records are identified for each pair of Potential_Match/smaller ping files 330, a great circle distance between the two geolocation beacons (cell tower/IP address) associated with the nearest-time matched pairs of geotemporal records from the two databases is calculated and preferably stored 340 for each Potential_Match in the Potential_Match database or table 270.

In one embodiment, all of the great circle distances for each pair of nearest-time matching records are then added and entered in the Potential_Matches database 270 as a cumulative_great_circle_distance field for each potentially matching geotemporal fingerprint from the Potential_Matches database. Additionally, or alternatively, the mean, median, mode, min, and/or max great circle distance can be calculated from the pairs of nearest-time matching records for each potentially matching fingerprint 350. The geotemporal fingerprint from the larger (second) database in the Potential_Matches database with the lowest mean great circle distance, or other chosen metric 350, is preferably determined to be the best match 360.

The foregoing process described for the first (partial) geotemporal fingerprint 250 with reference to FIGS. 2 and 3 can be repeated for every one of the geotemporal fingerprints 230 created from the smaller database files 220.

In other embodiments, the geotemporal fingerprint from the larger (second) database in the Potential_Matches database with the lowest median or mode or overall minimum great circle distance is used to determine the best match. Alternatively, one of skill in the art will recognize that a combination of these and other metrics useful in comparing the location and time data can be used to determine the best match.

The method of the present invention can be readily applied to a comparison of ping data from cell phone usage and payment card usage. In this case, the uncompressed ping data from the cell phone database is compared to the geotemporal data from payment card usage, which does not need to be initially compressed as described in FIG. 1. The payment card geotemporal data can comprise IP addresses from point-of-sale merchants and from user's on-line purchase activity.

For example, where IP addresses are included in payment stream data, it is possible to match IP addresses to payment card data in a straightforward manner to provide a more complete geotemporal history of a cardholder's usage.

In another embodiment, geotemporal data from on-line social networking activities is used to generate geotemporal fingerprints from geolocation and temporal records of usage of the on-line social network, which contain geolocation data in the form of internet addresses, and/or actual street address information. The geotemporal fingerprint(s) associated with one or more of a user's on-line social activities can be correlated with the geotemporal fingerprints of the payment card users according to the methods of the present disclosure, for use in identifying payment card theft, for example.

For example, it is generally known that as much as 50% of users of eCommerce sites are logged onto FACEBOOK® contemporaneously with the purchase. FACEBOOK® records the sites visited while a user is logged in. This information can then be matched to cardholder accounts using spend history. In addition to aiding in prevention of payment card fraud by providing another way to provide credit fraud protection without the need for registration, this information can be used to create a "purchase verification" service for the payment provider. In various additional embodiments, FACEBOOK® data can be enhanced with confirmations of purchase for use in FACEBOOK® advertising return of investment (ROI) calculations.

Another example of an on-line activity which can provide geotemporal data is INSTAGRAM®. This and similar services contain timestamp and geolocation metadata at the time a user uploads his or her photos (or any other media, video, or data having timestamp and location data). For users with substantial picture histories, correlations can be drawn between the geolocations of payment card usage and the photo geolocation and temporal data according to the methods of the present invention.

Similarly, various on-line "check-in" apps provide a check-in feature tied to a geolocation and timestamp, and thus can also be used to create, or supplement, geotemporal data for generating geotemporal fingerprints of users' on-line activity. If a reasonable number of check-ins are in proximity to purchases, the geolocation data generated by such check-in apps can be correlated with payment card usage.

In other embodiments, geotemporal fingerprints generated for users of a first database recording a particular activity, such as an on-line social networking activity, can be correlated with geotemporal fingerprints generated for users of a second database, which could be another on-line social networking activity, to identify users common to both databases. Such information can be used, for example, to identify common attributes and activities of a group of users, associated with the correlated data, and could be useful, for example, in developing targeted advertising campaigns.

In another embodiment, a composite geotemporal fingerprint can be formed for a user from more than one on-line social networking activity to form a more complete geotemporal fingerprint, which can then be used to compare with payment card usage, for example. The composite geotemporal fingerprint can be formed from matching fingerprints identified using the methods of the present disclosure. Accordingly, the composite fingerprint can include or merge a first fingerprint for a user formed from a first database, and a second fingerprint for the user formed from a second database. Otherwise, the composite geotemporal fingerprint may be formed from records from the two databases of networking activities otherwise known to belong to the same user.

As should be clear to those of skill in the art, the various embodiments of the methods of the present invention are implemented via computer software or executable instructions or code. Referring to FIG. 4, a system 400 for implementing the methods of the present disclosure includes at least a processor 410 including a Central Processing Unit (CPU), memory 420, and interface hardware 430 for connecting to external sources of data 435, for example, via the Internet 440.

Any of the raw, filtered, or generated tables and other databases described herein may be stored in an external memory 435, and accessed remotely, for example, via the Internet or other means, or may be stored in one of a number of local memory devices 420 of a system 400 for implementing the methods of the present disclosure.

The system 400 can be a computer with display 450 and input keypad or keyboard 460, and a media drive 465, or a handheld or other portable device with a display, keypad, memory, processor, network interface, and a media interface such as a flash drive. The memory 420 includes computer readable memory accessible by the CPU for storing instructions that when executed by the CPU 410 causes the processor 410 to implement the steps of the methods described herein. The memory 420 can include random access memory (RAM), read only memory (ROM), a storage device including a hard drive, or a portable, removable computer readable medium, such as a compact disk (CD) or a flash memory, or a combination thereof. The computer executable instructions for implementing the methods of the present invention may be stored in any one type of memory associated with the system 400, or distributed among various types of memory devices provided, and the necessary portions loaded into RAM, for example, upon execution.

In one embodiment, a non-transitory computer readable product is provided, which includes a computer readable medium, for example, computer readable medium 470 shown in FIG. 4 that can be accessed by the CPU via media drive 465, for storing computer executable instructions or program code for performing the method steps described herein. It should be recognized that the components illustrated in FIG. 4 are exemplary only, and that it is contemplated that the methods described herein may be implemented by various combinations of hardware, software, firmware, circuitry, and/or processors and associated memory, for example, as well as other components known to those of ordinary skill in the art.

While the invention has been particularly shown and described with reference to specific embodiments, it should be apparent to those skilled in the art that the foregoing is illustrative only and not limiting, having been presented by way of example only. Various changes in form and detail may be made therein without departing from the spirit and scope of the invention. Therefore, numerous other embodiments are contemplated as falling within the scope of the present invention as defined by the accompanying claims and equivalents thereto.

What is claimed is:

1. A method for linking a first user account associated with a first database comprising geotemporal data records for a plurality of users with a second user account associated with a second database comprising geotemporal data records for the plurality of users, each of the geotemporal data records comprising temporal data and a geolocation indicating a time and place the geotemporal data record is generated and a User ID associated with one of the plurality of users, the method comprising:

retrieving geotemporal data records for a first user from the first database generated over a predetermined period of time, each of the geotemporal data records retrieved comprising a first User ID associated with the first user;

determining fields for defining for each user a geotemporal fingerprint associated with the user from the geotemporal data records comprising the corresponding User ID, the fields distinguishing the user from other users associated with the first database;

generating a first geotemporal fingerprint corresponding to the first User ID based on the determined fields;

retrieving geotemporal data records from the second database generated for the plurality of users over the predetermined period of time, each of the geotemporal data records retrieved from the second database comprising a second User ID associated with one of the plurality of users;

generating, based on the determined fields, a set of second geotemporal fingerprints from the geotemporal data records retrieved from the second database, each second geotemporal fingerprint of the set being generated from geotemporal data records comprising the second User ID; and determining, from the set of second geotemporal fingerprints generated from the second database, a best match to the first geotemporal fingerprint, comprising identifying a set of geotemporal data record pairs occurring within a predefined time period of one another, each pair comprising a geotemporal data record corresponding to the first User ID and a geotemporal data record corresponding to one of the second User IDs, and calculating a parameter indicating a geographical distance between the geolocations of each of the geotemporal data record pairs, to identify the best match to the first geotemporal fingerprint, linking the second User ID corresponding to the best match with the first User ID corresponding to the first geotemporal fingerprint.

2. The method according to claim 1, further comprising identifying and recording a georegion encompassing the geolocation for each of the geotemporal data records retrieved from the first database and the second database, wherein the fields comprise at least a primary georegion, the primary georegion corresponding to the georegion in which each of the plurality of users is located for a longest time period within the predetermined period of time, the method further comprising calculating a total length of time from the temporal data associated with each of the georegions for each User ID, identifying the primary georegion for each User ID from the calculated total length of time, and generating the geotemporal fingerprint comprising the primary georegion associated with each User ID.

3. The method according to claim 2, further comprising identifying geotemporal fingerprints from the set generated from the second database for which the georegion identified as the primary georegion is the same as the georegion identified as the primary georegion of the first geotemporal fingerprint as potential matches; and comparing the geolocation and temporal data of the geotemporal data records in the fields of the first geotemporal fingerprint with the geolocation and temporal data in the fields of the geotemporal data records associated with each of the potential matches to identify the best match.

4. The method of claim 3, wherein the parameter is a great circle distance between the geolocations of each of the geotemporal data record pairs, the method further comprising calculating the great circle distance calculated for each of the geotemporal data record pairs within the set for each potential match.

5. The method of claim 4, wherein the best match is the one of the potential matches having a lowest mean great circle distance.

6. The method of claim 1, wherein the first database comprises cell phone ping data and the second database comprises geotemporal data records generated by payment card usage for the plurality of users.

7. The method of claim 1, wherein at least one of the first database and the second database comprises geotemporal data records generated by a social network activity.

8. The method of claim 7, wherein the geolocations and temporal data recorded in the geotemporal data records generated by the social network activity comprise at least one of internet protocol (IP) addresses, global positioning system (GPS) data, cellular phone ping data, call record details, and time-stamped textual data.

9. The method of claim 7, wherein the first database comprises geotemporal data records generated by the social network activity and the second database comprises geotemporal data records generated by payment card usage for the plurality of users.

10. The method of claim 2, wherein the fields for generating each geotemporal fingerprint further comprise a secondary georegion, the secondary georegion corresponding to the georegion in which each of the plurality of users is located for a second longest time period within the predetermined period of time, the method further comprising identifying the secondary georegion for each User ID from the calculated total length of time, and generating the geotemporal fingerprint further comprising the secondary georegion associated with each User ID.

* * * * *